United States Patent [19]
Kustor

[11] Patent Number: 5,896,673
[45] Date of Patent: Apr. 27, 1999

[54] MEANS AND METHOD FOR MEASUREMENT, DATA-ACQUISITION AND/ OR REGISTERING OF DIMENSIONAL DATA OF COMPONENT PARTS

[76] Inventor: László István Kustor, Lövér krt. 100, H-9400 Sopron, Hungary

[21] Appl. No.: 08/646,356

[22] PCT Filed: Nov. 24, 1994

[86] PCT No.: PCT/HU94/00054

§ 371 Date: May 10, 1996

§ 102(e) Date: May 10, 1996

[87] PCT Pub. No.: WO95/17645

PCT Pub. Date: Jun. 29, 1995

[30]       Foreign Application Priority Data

Dec. 8, 1993 [HU] Hungary ................................. 93 03479

[51] Int. Cl.⁶ .................................................. G01B 3/00
[52] U.S. Cl. ............................................. 33/679.1; 33/494
[58] Field of Search .............................. 33/706, 707, 708, 33/783, 784, 788, 819, 831, 494, 679.1; 364/562

[56]             References Cited

U.S. PATENT DOCUMENTS

| | | | |
|---|---|---|---|
| 999,730 | 8/1911 | Allen | 33/494 |
| 1,663,293 | 3/1928 | Cook | 33/494 |
| 3,889,377 | 6/1975 | Novak . | |
| 4,226,024 | 10/1980 | Westerberg et al. | 33/783 |
| 4,229,883 | 10/1980 | Kobashi | 33/784 |
| 4,435,904 | 3/1984 | Logan et al. . | |
| 4,845,646 | 7/1989 | Marquis et al. | 33/784 |
| 4,974,164 | 11/1990 | Lewis et al. . | |
| 5,406,715 | 4/1995 | Koizumi et al. | 33/706 |

FOREIGN PATENT DOCUMENTS

| | | | |
|---|---|---|---|
| 167267 | 12/1950 | Austria . | |
| 2587104 | 3/1987 | France | 33/784 |
| 2589565 | 5/1987 | France | 33/784 |
| 156787 | 11/1932 | Germany . | |

*Primary Examiner*—G. Bradley Bennett
*Attorney, Agent, or Firm*—Venable; Gabor J. Kelemen

[57]             ABSTRACT

The invention relates to a means for the measurement of longitudinal dimensions, comprising a scale graduated in units corresponding to the measuring unit and provided with means for reading said scale, further a computerized data-acquisition and/or registering system and a method for measuring and/or computer processing of dimensional data given in technical inches. The scale unit of the scale of the measuring means is a measuring unit equal to 1/16th of a technical inch and/or its decimal fraction. The measuring means is provided with a vernier of a length by one division less than ten, or an integer multiple of ten measuring units, this vernier being graduated in ten, or in some integer multiple of ten, divisions. The invention further comprises a new unit used for converting measured values into decimal fractions called K units.

11 Claims, 2 Drawing Sheets

| K-Inches | Inches | | mm | K-Inches | Inches | | mm |
|---|---|---|---|---|---|---|---|
| 0.25 | 1/64" | 0.015 625 | 0.396 875 | 8.25 | 33/64" | 0.515 625 | 13.096 875 |
| 0.50 | 1/32" | 0.031 250 | 0.793 750 | 8.50 | 17/32" | 0.531 250 | 13.493 750 |
| 0.75 | 3/64" | 0.046 875 | 1.190 625 | 8.75 | 35/64" | 0.546 875 | 13.890 625 |
| 1.00 | 1/16" | 0.062 500 | 1.587 500 | 9.00 | 9/16" | 0.562 500 | 14.287 500 |
| 1.25 | 5/64" | 0.078 125 | 1.984 375 | 9.25 | 37/64" | 0.578 125 | 14.684 375 |
| 1.50 | 3/32" | 0.093 750 | 2.381 250 | 9.50 | 19/32" | 0.593 750 | 15.081 250 |
| 1.75 | 7/64" | 0.109 375 | 2.778 125 | 9.75 | 39/64" | 0.609 375 | 15.478 125 |
| 2.00 | 1/8" | 0.125 000 | 3.175 000 | 10.00 | 5/8" | 0.625 000 | 15.875 000 |
| 2.25 | 9/64" | 0.140 625 | 3.571 875 | 10.25 | 41/64" | 0.640 625 | 16.271 875 |
| 2.50 | 5/32" | 0.156 250 | 3.968 750 | 10.50 | 21/32" | 0.656 250 | 16.668 750 |
| 2.75 | 11/64" | 0.171 875 | 4.365 625 | 10.75 | 43/64" | 0.671 875 | 17.065 625 |
| 3.00 | 8/16" | 0.187 500 | 4.762 500 | 11.00 | 11/16" | 0.687 500 | 17.462 500 |
| 3.25 | 18/64" | 0.203 125 | 5.159 375 | 11.25 | 45/64" | 0.703 125 | 17.859 375 |
| 3.50 | 7/32" | 0.218 750 | 5.556 250 | 11.50 | 23/32" | 0.718 750 | 18.256 250 |
| 3.75 | 15/64" | 0.234 375 | 5.593 125 | 11.75 | 47/64" | 0.734 375 | 18.653 125 |
| 4.00 | 1/4" | 0.250 000 | 6.350 000 | 12.00 | 3/4" | 0.750 000 | 19.050 000 |
| 4.25 | 17/64" | 0.265 625 | 6.746 875 | 12.25 | 49/64" | 0.765 625 | 19.446 875 |
| 4.50 | 9/32" | 0.281 250 | 7.143 750 | 12.50 | 25/32" | 0.781 250 | 19.843 750 |
| 4.75 | 19/64" | 0.296 875 | 7.510 625 | 12.75 | 51/64" | 0.796 875 | 20.240 625 |
| 5.00 | 5/16" | 0.312 500 | 7.937 500 | 13.00 | 13/16" | 0.812 500 | 20.637 500 |
| 5.25 | 21/64" | 0.328 125 | 8.334 375 | 13.25 | 53/64" | 0.828 125 | 21.034 375 |
| 5.50 | 11/32" | 0.343 750 | 8.731 250 | 13.50 | 27/32" | 0.843 750 | 21.431 250 |
| 5.75 | 23/64" | 0.359 375 | 9.128 125 | 13.75 | 55/64" | 0.859 375 | 21.828 125 |
| 6.00 | 3/8" | 0.375 000 | 9.525 000 | 14.00 | 7/8" | 0.875 000 | 22.225 000 |
| 6.25 | 25/64" | 0.390 625 | 9.921 875 | 14.25 | 57/64" | 0.890 625 | 22.621 875 |
| 6.50 | 13/32" | 0.406 250 | 10.318 750 | 14.50 | 29/32" | 0.906 250 | 23.018 750 |
| 6.75 | 27/64" | 0.421 875 | 10.715 625 | 14.75 | 59/64" | 0.921 875 | 23.415 625 |
| 7.00 | 7/16" | 0.437 500 | 11.112 500 | 15.00 | 15/16" | 0.937 500 | 23.812 500 |
| 7.25 | 29/64" | 0.453 125 | 11.509 375 | 15.25 | 61/64" | 0.953 125 | 24.209 375 |
| 7.50 | 15/32" | 0.468 750 | 11.906 250 | 15.50 | 31/32" | 0.968 750 | 24.606 250 |
| 7.75 | 31/64" | 0.484 375 | 12.303 125 | 15.75 | 63/64" | 0.984 375 | 25.003 125 |
| 8.00 | 1/2" | 0.500 000 | 12.700 000 | 16.00 | 1" | 1.000 000 | 25.400 000 |

| K-Inches | Inches | | mm | K-Inches | Inches | | mm |
|---|---|---|---|---|---|---|---|
| 0.25 | 1/64" | 0.015 625 | 0.396 875 | 8.25 | 33/64" | 0.515 625 | 13.096 875 |
| 0.50 | 1/32" | 0.031 250 | 0.793 750 | 8.50 | 17/32" | 0.531 250 | 13.493 750 |
| 0.75 | 3/64" | 0.046 875 | 1.190 625 | 8.75 | 35/64" | 0.546 875 | 13.890 625 |
| 1.00 | 1/16" | 0.062 500 | 1.587 500 | 9.00 | 9/16" | 0.562 500 | 14.287 500 |
| 1.25 | 5/64" | 0.078 125 | 1.984 375 | 9.25 | 37/64" | 0.578 125 | 14.684 375 |
| 1.50 | 3/32" | 0.093 750 | 2.381 250 | 9.50 | 19/32" | 0.593 750 | 15.081 250 |
| 1.75 | 7/64" | 0.109 375 | 2.778 125 | 9.75 | 39/64" | 0.609 375 | 15.478 125 |
| 2.00 | 1/8" | 0.125 000 | 3.175 000 | 10.00 | 5/8" | 0.625 000 | 15.875 000 |
| 2.25 | 9/64" | 0.140 625 | 3.571 875 | 10.25 | 41/64" | 0.640 625 | 16.271 875 |
| 2.50 | 5/32" | 0.156 250 | 3.968 750 | 10.50 | 21/32" | 0.656 250 | 16.668 750 |
| 2.75 | 11/64" | 0.171 875 | 4.365 625 | 10.75 | 43/64" | 0.671 875 | 17.065 625 |
| 3.00 | 8/16" | 0.187 500 | 4.762 500 | 11.00 | 11/16" | 0.687 500 | 17.462 500 |
| 3.25 | 18/64" | 0.203 125 | 5.159 375 | 11.25 | 45/64" | 0.703 125 | 17.859 375 |
| 3.50 | 7/32" | 0.218 750 | 5.556 250 | 11.50 | 23/32" | 0.718 750 | 18.256 250 |
| 3.75 | 15/64" | 0.234 375 | 5.593 125 | 11.75 | 47/64" | 0.734 375 | 18.653 125 |
| 4.00 | 1/4" | 0.250 000 | 6.350 000 | 12.00 | 3/4" | 0.750 000 | 19.050 000 |
| 4.25 | 17/64" | 0.265 625 | 6.746 875 | 12.25 | 49/64" | 0.765 625 | 19.446 875 |
| 4.50 | 9/32" | 0.281 250 | 7.143 750 | 12.50 | 25/32" | 0.781 250 | 19.843 750 |
| 4.75 | 19/64" | 0.296 875 | 7.510 625 | 12.75 | 51/64" | 0.796 875 | 20.240 625 |
| 5.00 | 5/16" | 0.312 500 | 7.937 500 | 13.00 | 13/16" | 0.812 500 | 20.637 500 |
| 5.25 | 21/64" | 0.328 125 | 8.334 375 | 13.25 | 53/64" | 0.828 125 | 21.034 375 |
| 5.50 | 11/32" | 0.343 750 | 8.731 250 | 13.50 | 27/32" | 0.843 750 | 21.431 250 |
| 5.75 | 23/64" | 0.359 375 | 9.128 125 | 13.75 | 55/64" | 0.859 375 | 21.828 125 |
| 6.00 | 3/8" | 0.375 000 | 9.525 000 | 14.00 | 7/8" | 0.875 000 | 22.225 000 |
| 6.25 | 25/64" | 0.390 625 | 9.921 875 | 14.25 | 57/64" | 0.890 625 | 22.621 875 |
| 6.50 | 13/32" | 0.406 250 | 10.318 750 | 14.50 | 29/32" | 0.906 250 | 23.018 750 |
| 6.75 | 27/64" | 0.421 875 | 10.715 625 | 14.75 | 59/64" | 0.921 875 | 23.415 625 |
| 7.00 | 7/16" | 0.437 500 | 11.112 500 | 15.00 | 15/16" | 0.937 500 | 23.812 500 |
| 7.25 | 29/64" | 0.453 125 | 11.509 375 | 15.25 | 61/64" | 0.953 125 | 24.209 375 |
| 7.50 | 15/32" | 0.468 750 | 11.906 250 | 15.50 | 31/32" | 0.968 750 | 24.606 250 |
| 7.75 | 31/64" | 0.484 375 | 12.303 125 | 15.75 | 63/64" | 0.984 375 | 25.003 125 |
| 8.00 | 1/2" | 0.500 000 | 12.700 000 | 16.00 | 1" | 1.000 000 | 25.400 000 |

*FIG. 1*

MEANS AND METHOD FOR MEASUREMENT, DATA-ACQUISITION AND/OR REGISTERING OF DIMENSIONAL DATA OF COMPONENT PARTS

TECHNICAL FIELD

The invention relates to means for length measurements with a scale calibrated in units corresponding to the used units of measurement. The invention relates further to a means for measuring longitudinal dimensions having a scale graduated in millimeters and a scale reading means. The invention relates also to a computerized data-acquisition and/or registering system and to a method for measuring and/or computerized processing of dimensional data given in technical inches.

BACKGROUND ART

In several parts of the world the inch system has retained its standardized state, where the so-called "technical inch" is used as measuring unit for specifying data of technical dimensions, lengths. The exact value of this "technical inch" expressed in millimeters is 25.4 mm. Component parts with dimensions given in inches, e.g., ball bearings being used, stored and even manufactured—at least for replacement purposes—in countries where only the metric system is standard.

Dimensions smaller than one inch are expressed as fractions of the inch: x/2, x/4, x/8, x/16, x/32, x/64, x/128, x/256, x/512, etc. This system of expressing dimensions does not allow the use of arbitrary intermediate sizes, especially in the range of zero to $1/128$". A further deficiency of this unit system results form the incapability of computers (functioning in decimal system) of performing arithmetic operations—e.g., finding the sum of a series of dimensions—without converting the dimensions into the decimal (metric) system, and after this conversion, the resultant metric value has to be re-converted into the inch system. This conversion to the decimal system has to be performed with an accuracy of at least six decimals in order to prevent—in the course of rounding the obtained data—occurrence of errors of magnitude exceeding the order of $1/100$ millimeters (see the table of FIG. 1). Computerized registering and arranging of component parts in the series of rounded sizes are also more problematic than that of sizes expressed in millimeters, and can only be done in a system specifically developed for this purpose. Trouble is caused also when component parts suitable for mutual replacement but having dimensions given in different unit systems are to be compared and matched. No satisfactory solution can be found when this comparison is to be made by converting dimensions given in inches to millimeter dimensions, because the results appear as eight-digit decimal fractions, which are difficult to keep in mind, difficult to handle and are not round whole numbers.

It is an everyday task to compare inch dimensions with those given in millimeters. For this comparison almost invariably a calculator is used, multiplying the dimension concerned with the respective conversion factor, just as the gauge used for this purpose is almost exclusively a slide caliper provided with a scale graduated both in inches and millimeters.

SUMMARY OF THE INVENTION

There is a demand for a measuring and evaluating means to perform, in an unrestricted and simple way, arithmetic operations with dimensions measured or given in inches, by providing an unambiguous link between, and eliminating the deficiencies of, the two measuring units, said means being capable of displaying the inch dimension in the form of a single number consisting of a few digits lending itself to be processed by a computer and easy to memorize.

The invention is based on the recognition that any numerical value can be expressed by a single number in the decimal system in units equal to $1/16$ of an inch. Although the mathematical base of this recognition is not entirely new ($1/16$ of an inch as unity and the integer multiple of it have already been used for denoting quantities), new is the recognition that the fractions of the unit expressed in decimal form may find use in technical applications.

An object of the invention is to eliminate the deficiencies of known measuring gauges and data acquisition and data-registering means, when dimensions given in inches are to be dealt with by proposing a gauge for length measurements, a data processing means and a measuring method suitable for defining inch dimensions by means of easily memorizable numbers of relatively few digits suited for performing arithmetic operations in the decimal system. A further object is to propose a method for being used even in the range of zero to $1/128$ inches. A still further object is to provide a solution suited for expressing with satisfactory accuracy, by numbers consisting of few digits, such dimensions, which cannot be expressed as fractions of an inch.

The above objects are accomplished with the invention by providing a length-measuring gauge having provided with a scale graduated in scale units corresponding to a measuring unit, where the measuring unit to which said scale units are graduated, is the measuring unit corresponding to $1/16$ part of the technical inch and/or to its decimal fraction (its tenth, hundredth or thousandth etc., part of $1/16$ inch) expressed in the decimal system.

Advantageously, the length-measuring gauge is provided with a vernier of length by one scale unit shorter than ten, or an integer multiple of ten such scale units, the vernier having ten, or an integer multiple of ten, scale units.

Expediently, the length-measuring gauge is designed as a position-transmitter.

Advantageously, the length-measuring gauge is provided with means converting the measured inch values to millimeters, said means being connected to a position transmitter.

Expediently, said means for converting the measured value to millimeters comprises a memory for storing the constant $K_1=1.5875$ and a means for multiplying the measured values by said constant.

Advantageously, the memory for storing the constant $K_1=1.5875$ is a semiconductor storage memory of a desk computer or a manual calculator.

The arrangement according to the invention is, further, a means for measuring longitudinal dimensions provided with a scale graduated in millimeters and with a scale-reading means, said means comprising a unit connected to the scale-reading means and serving for converting the value measured in integer of measuring units corresponding to $1/16$ part of the technical inch and the rest part of the length data in the measuring units decimal fraction, given in decimal system into the length data, expressed with an accuracy of one or more decimal figures.

Advantageously, the converter unit comprises a memory for storing the constant $K_1=1.5875$ and means for dividing the measured length data expressed in millimeters by said constant $K_1$.

Further according to the invention, a computerized data-acquisition and/or registering system is provided, comprising a unit for converting the data entered in terms of technical inches into data expressed in measuring units corresponding to $\frac{1}{16}$ part of a technical inch and its decimal fraction.

Advantageously, the converting unit comprises a memory for storing the constant $K_2=16$ and a means for multiplying the data to be converted by said constant $K_2$. The invention further provides a measuring method for the measurement and/or computerized processing of data given in terms of technical inches wherein the dimension data given in inches will be expressed in an integer of measuring units corresponding to $\frac{1}{16}$ of the technical inch and—the rest part of the dimension—in the measuring unit's decimal fraction given in decimal system into the dimension's data, and performing arithmetic and/or storing operations with these quantities.

The invention introduces a new measuring unit, K, which is much more suitable than other known methods for processing inch measurements, for stock-list keeping, for determining tolerance, etc., and is more descriptive for its user than inch or millimeter measurements. Another advantage of the solution according to the invention is its suitability for expressing any inch measurement with a figure consisting of an equal number of decimal digits and with equal accuracy where the required number of decimal digits is only about half of the number of decimals necessary to express with equal accuracy an inch measurement converted into millimeters.

BRIEF DESCRIPTION OF THE DRAWINGS

In the following, with reference to the drawing showing embodiments, the main features of the invention are described in detail. In the drawing FIG. 1 is a comparative table of measurements

DESCRIPTION OF THE PREFERRED EMBODIMENTS

MODES FOR CARRYING OUT THE INVENTION

The table of FIG. 1 shows measurements in the range of $\frac{1}{64}$ to 1 technical inches expressed as fractions, where the values of proper fractions of the corresponding inch measurements expressed in decimals and the values of inch measurements expressed in millimeters are shown. The three columns mentioned are known.

In the first column (of heading: "K inches") the measurements are expressed in K units (in multiples of $\frac{1}{16}$ inch) as decimal fractions. The second digit of each measurement expressed by an integer number and two digits of the decimal fraction corresponds to the minimum step of longitudinal dimensions, i.e., one hundredth of 1.5857 millimeters, providing a sufficiently fine resolution for technical measurements occurring in the usual range of dimensions given in inch units. The numbers of K inches can be compared and also other arithmetic operations can be performed with them, so that the result will also be a measurement expressed in units of K. A great advantage of introducing and using this unit is its suitability for being processed by a computer without any conversion or restriction, only requiring the addition of information of the meaning of unit K. That means that known programs are suitable for arranging these numbers in sequence of their amount, whereas a similar arrangement of proper fractions cannot be achieved with a computer operating in the decimal system without conversion of numbers.

Figure 2:
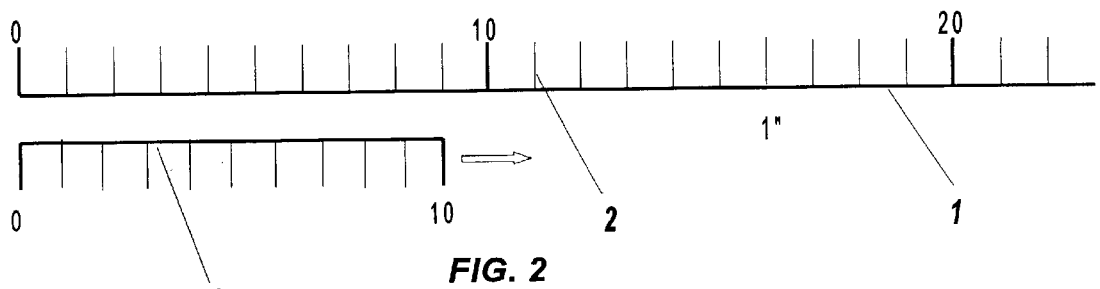
FIG. 2 is the scale of a measuring gauge and its vernier

In FIG. 2 the scale 1 of the stationary part of a slide caliper gauge and the vernier 3 of the same is shown. Otherwise, the slide caliper gauge is a commonly known measuring means, so that its illustration in full and its detailed description have been omitted. The scales of known slide calipers are provided with millimeter divisions, and some calipers are additionally calibrated in technical inches (1"=2.54 mm) and in fractions (½, ¼, ⅛) of it.

Scale 1 of the gauge complying with the invention, on the other hand, (additionally to the mm-graduation or independently) is provided with scale units 2 corresponding to the measuring units of K, sixteen of such units making out an inch, so that 1K is equal to a length of 1.5875 mm.

In the example, the vernier of the moving part sliding along the scale 1 has a length of 9K, this length being provided with a scale of 10 divisions. Operation, and the method of its reading is fully identical with that of a slide caliper provided with mm divisions.

Accordingly, the integers are read off on the scale 1 of the stationary part, whereas the readings of fractions are taken on the vernier 3 at that division of the vernier that exactly coincides with a division of the stationary scale. With the vernier of the example the first decimal of the numerical value can exactly be read off, and the second decimal can be estimated.

To render more accurate readings possible a longer vernier can be used. The gauge for measuring longitudinal dimensions of component parts—if there is one—is invariably provided with a vernier 3 having a length by one measuring unit K shorter than ten (or an integer multiple of ten) measuring units, said vernier being provided with ten, or an integer multiple of ten, divisions. From the described measuring gauge the measured longitudinal dimension can be read off directly in terms of K.

As measuring gauge not only a slide caliper, but other mechanical measuring means (micrometer, caliber, gauge block, etc.) can be used as well. It can take the form of the travel transmitter (position detector) of a drafting machine or machine tool, where the principle of measurement is similar to that of a slide caliper, and only the design of the gauge is entirely different, e.g., the scale divisions are substituted by signal sources, and the tasks of vernier graduations are accomplished by capacitive, magnetic, electromagnetic or optical sensors.

Figure 3:
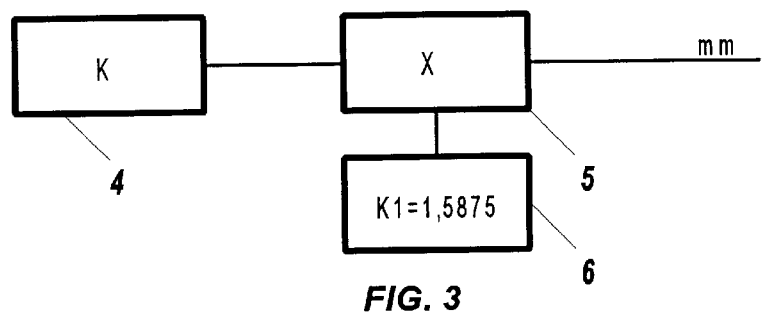
FIG. 3 is a block diagram of a means for measurement.
Figure 4:
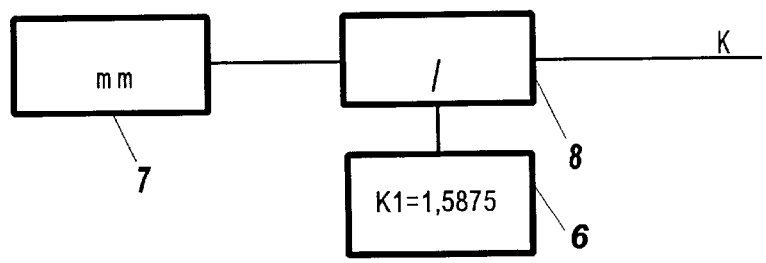
FIG. 4 is a block diagram of another means for measurement.

In FIG. 3 the block diagram of a device converting the measuring values given in terms of K into measuring units expressed in millimeters is shown. In the device, to the output of a position transmitter 4 an input of a multiplier unit 5 is connected, an other input thereof being linked with a constant storing memory 6. In constant storing memory 6 the constant $K_1=1.5875$ is stored. When multiplying the measured dimension K by said constant $K_1$, the value of the measured dimension expressed in millimeters is obtained as output of the multiplier unit 5. Installing said constant storing memory 6, as a ROM, into a manual electronic calculator, and causing the display of the result by pressing a key, an easy-to-handle converting means can be obtained.

A slide caliper or another kind of measuring device—producing measured lengths expressed in terms of K—can be provided also with a millimeter scale (with a vernier sliding along it), if it is equipped with a readout unit 7 giving a measuring signal output suitable for digital processing. To the readout unit 7 a divider means 8 is connected, to the other input of which the constant storage memory 9 storing the constant $K_1=1.5875$ is attached. Dividing by $K_1$ the value measured in millimeters fed to the input of divider means 8, at the output of the latter the numerical value of dimension expressed in K units is obtained. Instead of the readout unit 7 another input means, e.g., the keyboard of a computer may be connected to the divider unit 8.

Figure 5:
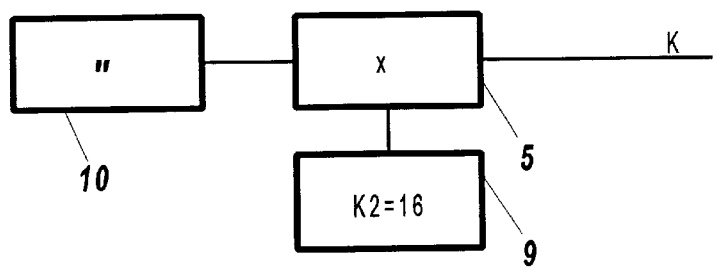
FIG. 5 is a block diagram of a converting unit.

The computerized data-acquisition and/or registering equipment, accomplished with the use of unit system K, is equipped with a unit by means of which the data given in terms of technical inches and entered through an input unit 10 are converted into data expressed in decimal units corresponding to $\frac{1}{16}$ of the technical inch and its decimal fraction, where said converting unit contains a memory 9 for storing the constant $K_2=16$ and a multiplier means 5 for multiplying by constant $K_2$ the data to be converted (FIG. 5). By the converting unit the numerical value of the dimension given as a fraction is converted to a decimal number of accuracy of two or more decimal digits, this number being the numerical value of the longitudinal size expressed in terms of K.

The numerical data of a measurement expressed in terms of K is suitable for denoting in the drawing unambiguously the longitudinal measurement of a component part written either beside, or instead of, the measurement given in inches. That way, the respective component part can be identified by simple inspection by the data appearing in the list of stored parts.

According to the measuring method based on the application of unit system K, suitable for measuring and/or computerized processing of dimensions given in technical inches, the data given in inches are expressed in integer of measurement units equal to $\frac{1}{16}$ of the technical inch and the remaining fractional parts are given in the measuring unit's ($\frac{1}{16}$") decimal fraction, and all arithmetic and/or storing operations are performed with these quantities. Such a series of arithmetic operations is required e.g. for the determination the length of a section by measuring distance of both ends of the section from a reference point. The arithmetic operation applied here is subtraction. Another measuring task often occurring is the measurement of lengths of successive sections and the determination of the overall length by adding up the measured partial lengths.

INDUSTRIAL APPLICABILITY

The method complying with the invention results in a reduction of the time required, because e.g., a dimension given in units of K with an accuracy of four decimal digits corresponds—in a measured value which is not a whole number—to the value of an inch measurement converted to millimeters to an accuracy of eight decimal digits, so the arithmetic operations can be performed with less digits to satisfy the same demand of accuracy.

I claim:

1. Means for length measurements comprising a scale graduated in measuring units each equalling $\frac{1}{16}$ of the technical inch and decimal fraction parts thereof.

2. Means for length measurements, as claimed in claim 1, characterized in having a vernier (3) of a length by one measuring unit shorter than one of ten and an integer multiple of ten said measuring units, said vernier being provided with one of ten and an integer multiple of ten scale divisions.

3. Means for length measurements as claimed in claim 1, characterized in that it is a position transmitter (4).

4. Means for length measurements as claimed in claim 3, characterized in that it is provided with a means coupled to a position transmitter (4) and serving for converting the measured inch values to millimeters.

5. Means for length measurements as claimed in claim 4, characterized in that the means converting the measured values to millimeters comprises a memory unit (6) for storing the constant $K_1=1.5875$ and a means (5) for multiplying the measured values by said constant.

6. Means for length measurements as claimed in claim 5, characterized in that the memory (6) unit storing the constant $K_1=1.5875$ is a semiconductor memory unit of one of a manual calculator and a desk-mounted computer.

7. Means for measuring longitudinal dimensions, having a scale graduated in millimeters and a scale reading means, characterized in that said length measuring means, connected to said scale-reading means (7), is provided with a unit for converting the length data measured in mm in a whole number of measuring units corresponding to $\frac{1}{16}$ of the technical inch and the remaining part of the length data in the measuring unit's decimal fraction, given in decimal system into length data, expressed with an accuracy of at least one decimal digit.

8. Means for measuring longitudinal dimensions as claimed in claim 7, characterized in that its unit for converting measured values incorporates a memory (6) for storing the constant $K_1=1.5875$ and a means (8) for dividing the measured length expressed in millimeters by said constant $K_1$.

9. Computerized data-acquisition and registering system, further comprising a unit for converting the data entered in terms of technical inches into data expressed in measuring units corresponding to $\frac{1}{16}$ part of a technical inch and its decimal fraction.

10. Data-acquisition and registering system as claimed in claim 9, characterized in that the converting unit comprises a memory (9) for storing the constant $K_2=16$ and a means for multiplying the data to be converted by said constant $K_2$.

11. Measuring method for the measurement and computerized processing of data given in terms of technical inches comprising the steps of expressing the dimension data, given in inches, in an integer of measuring units corresponding to $\frac{1}{16}$ of the technical inch; expressing the remaining part of the dimension in the measuring unit's decimal fraction given in decimal system into the dimension's data, and performing arithmetic and storing operations with these quantities.

\* \* \* \* \*